(12) United States Patent
Moriya et al.

(10) Patent No.: US 11,898,884 B2
(45) Date of Patent: Feb. 13, 2024

(54) STROKE SENSOR AND BRAKE SYSTEM AND STEERING SYSTEM FOR VEHICLE USING THE SAME

(71) Applicant: TDK Corporation, Tokyo (JP)

(72) Inventors: Takahiro Moriya, Tokyo (JP); Toshihiko Oyama, Tokyo (JP); Keiji Suzuki, Tokyo (JP); Toshio Ishikawara, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/875,617

(22) Filed: Jul. 28, 2022

(65) Prior Publication Data

US 2023/0077951 A1 Mar. 16, 2023

(30) Foreign Application Priority Data

Sep. 3, 2021 (JP) ................... 2021-143883

(51) Int. Cl.
  *G01D 5/14* (2006.01)
  *B62D 15/02* (2006.01)
  *B60T 17/22* (2006.01)

(52) U.S. Cl.
  CPC ............... *G01D 5/14* (2013.01); *B60T 17/22* (2013.01); *B60T 2220/04* (2013.01); *B62D 15/0225* (2013.01)

(58) Field of Classification Search
  CPC ...................................................... G01D 5/14
  See application file for complete search history.

(56) References Cited

U.S. PATENT DOCUMENTS

| | | | |
|---|---|---|---|
| 7,166,996 B2* | 1/2007 | Godkin | G01D 5/145 324/207.2 |
| 9,035,645 B2* | 5/2015 | Mizutani | G01B 7/003 324/207.2 |
| 2011/0133724 A1 | 6/2011 | Fukuoka et al. | |
| 2016/0273461 A1* | 9/2016 | Cousins | F16H 63/502 |
| 2023/0160723 A1* | 5/2023 | Matsumoto | G01D 5/16 324/207.24 |

FOREIGN PATENT DOCUMENTS

JP    2010-267580 A    11/2010
JP    5013146 B2    8/2012

* cited by examiner

*Primary Examiner* — Walter L Lindsay, Jr.
*Assistant Examiner* — Milton Gonzalez
(74) *Attorney, Agent, or Firm* — POSZ LAW GROUP, PLC

(57) ABSTRACT

A stroke sensor that allows adjustment of the magnetic field distribution without changing the positions of the magnets is provided. Stroke sensor 1 has magnets 2A, 2B, and sensor 3A that detects a magnetic field that is generated by magnets 2A, 2B. Magnets 2A, 2B are movable relative to sensor 3A in first direction X. Magnet 2A has surface 5A that faces sensor 3A in second direction Z, magnet 2B has surface 5B that faces sensor 3A in second direction Z, and surface 5A and surface 5B have different polarities. A position in first direction X at which magnetic field intensity in second direction Z is zero is positioned between reference axis RA and magnet 2B. Reference axis RA is parallel to second direction Z and passes through middle point MP of minimum section S that includes magnets 2A, 2B in first direction X.

22 Claims, 12 Drawing Sheets

Relative disp. of magnets (mm)

Relative disp. of magnets (mm)

STROKE SENSOR AND BRAKE SYSTEM AND STEERING SYSTEM FOR VEHICLE USING THE SAME

BACKGROUND OF THE INVENTION

1. Field of the Invention

The present application is based on, and claims priority from, JP2021-143883, filed on Sep. 3, 2021, the disclosure of which is hereby incorporated by reference herein in its entirety.

The present invention relates to a stroke sensor, as well as to a brake system and a steering system for a vehicle using the same.

2. Description of the Related Art

There is known a stroke sensor having a magnetic field detecting sensor and a magnet that linearly moves relative to the magnetic field detecting sensor. The magnet is connected to an object to be measured, and the magnet moves together with the object. The moving distance of the magnet is detected by the magnetic field detecting sensor by sensing change in the intensity of a magnetic field that is generated by the magnet, and the moving distance of the object can be measured accordingly. JP5013146B discloses a stroke sensor having magnets that are spaced out and a magnetic field detecting sensor that faces the magnets.

SUMMARY OF THE INVENTION

The magnets of the stroke sensor disclosed in JP5013146B have the same shape and dimensions. Therefore, the magnetic field that is generated between adjacent magnets is sinusoidal, and the magnetic field intensity in the direction perpendicular to the pole surfaces of the magnets is zero at the middle point between adjacent magnets. However, for example, when the moving range of the magnets is limited, or when the position of the magnetic field detecting sensor is limited, such a magnetic field distribution may make it difficult to obtain the magnetic field intensity that is required for the magnetic field detecting sensor.

The present invention aims at providing a stroke sensor that allows adjustment of the magnetic field distribution without changing the positions of the magnets.

A stroke sensor of the present invention comprises:
a first magnet;
a second magnet, wherein a distance between the first magnet and the second magnet in a first direction is fixed; and
a first magnetic field detecting sensor that is arranged apart from the first and second magnets in a second direction perpendicular to the first direction, wherein the first magnetic field detecting sensor detects a magnetic field that is generated by the first and second magnets.

The first and second magnets are movable relative to the first magnetic field detecting sensor in the first direction. The first magnet has a first surface that faces the first magnetic field detecting sensor in the second direction, the second magnet has a second surface that faces the first magnetic field detecting sensor in the second direction, and the first surface and the second surface have different polarities. A position in the first direction at which magnetic field intensity in the second direction is zero is positioned between a reference axis and the second magnet, wherein the reference axis is parallel to the second direction and passes through a middle point of a minimum section that includes the first and second magnets in the first direction.

According to the present invention, it is possible to provide a stroke sensor that allows adjustment of the magnetic field distribution without changing the positions of the magnets.

The above and other objects, features and advantages of the present invention will become apparent from the following description with reference to the accompanying drawings that illustrate examples of the present invention.

DESCRIPTION OF EMBODIMENTS

Embodiments of the present invention will now be described with reference to the drawings. In the following descriptions, the first direction means the direction in which the first magnet and the second magnet are arranged and may be referred to as the X direction. The second direction means a direction perpendicular to the first direction, or a direction perpendicular both to the first surface of the first magnet and to the second surface of the second magnet and may be referred to as the Z direction. The direction perpendicular both to the first and second directions may be referred to as a third direction or the Y direction. As will be apparent from the following descriptions, second magnetic field detecting sensor 3B is not an essential element of the present invention and may be omitted.

First Embodiment

Figure 1:
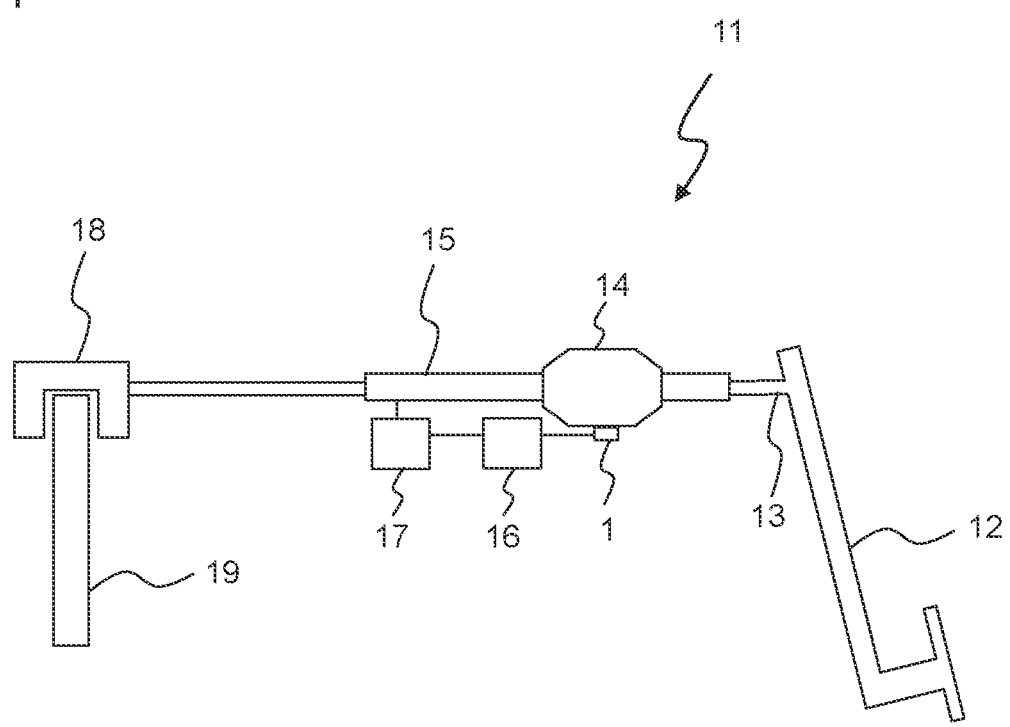
FIG. 1 is a conceptual view of a brake system for a vehicle using a stroke sensor.

FIG. 1 is a conceptual view illustrating a brake system to which stroke sensor 1 of the present embodiment may be applied. Brake system 11 includes brake pedal 12, booster 14 that is connected to brake pedal 12 via connecting element 13, master cylinder 15 that is connected to booster 14, caliper 18 that is connected to master cylinder 15, control unit 16, motor 17, and stroke sensor 1. Stroke sensor 1 measures the amount of depression of brake pedal 12 and sends it to control unit 16. Control unit 16 controls the driving force of motor 17 depending on the amount of depression of brake pedal 12, and motor 17 assists booster 14. The braking force that is inputted from brake pedal 12 is amplified by booster 14 that is assisted by motor 17 and is then transferred to caliper 18 via master cylinder 15. Caliper 18 brakes brake disk 19.

Figure 2A:
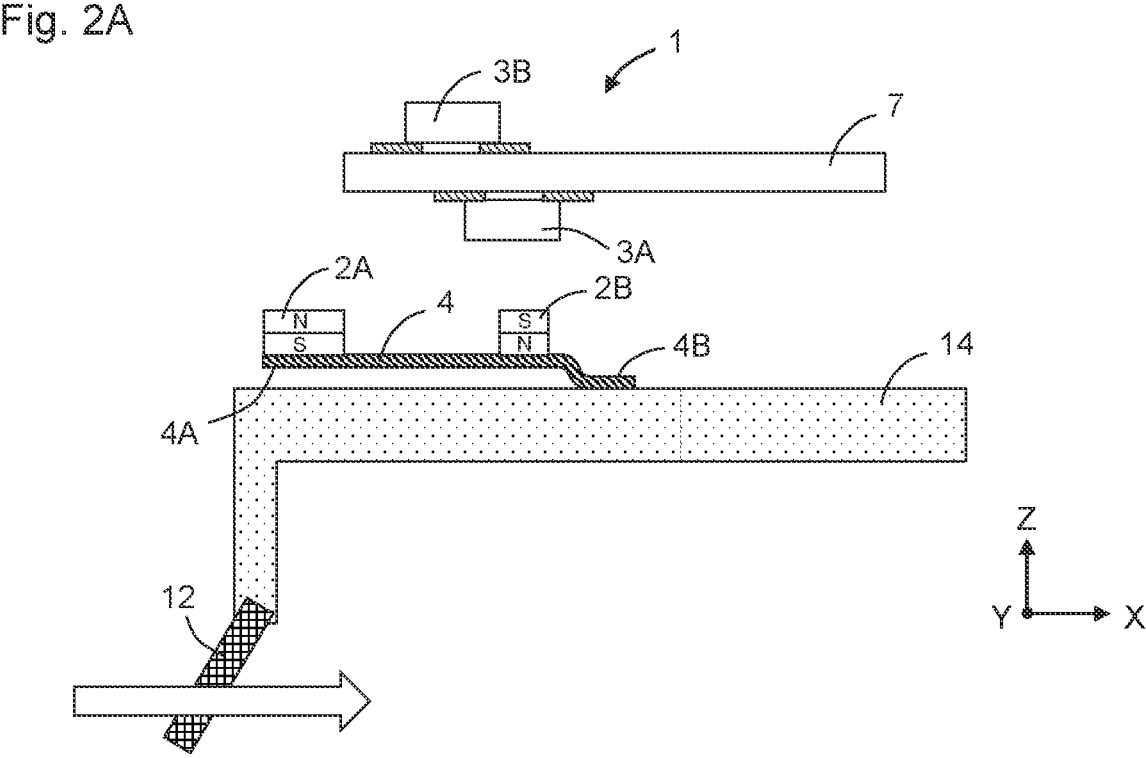
FIG. 2A is a view schematically illustrating the arrangement of a stroke sensor according to a first embodiment.

FIG. 2A schematically illustrates the arrangement of stroke sensor 1 according to the first embodiment. Stroke sensor 1 has first magnet 2A, second magnet 2B, first magnetic field detecting sensor 3A and second magnetic field detecting sensor 3B. As will be described later, the magnetic field that is generated by first magnet 2A and second magnet 2B is detected by first magnetic field detecting sensor 3A and second magnetic field detecting sensor 3B. First magnet 2A and second magnet 2B are supported by support structure 4 that is made of a soft magnetic body. Support structure 4 is a cantilever, one end of which is fixed to booster 14. First magnet 2A is fixed to end portion 4A of support structure 4, and second magnet 2B is fixed to support structure 4 between end portion 4A and base portion 4B thereof. Thus, the distance between first magnet 2A and second magnet 2B in first direction X is fixed. First and second magnets 2A, 2B are movable in first direction X in accordance with the operation of brake pedal 12, and first magnetic field detecting sensor 3A and second magnetic field detecting sensor 3B are fixed to the housing (not illustrated) of brake booster 14. As a result, first and second magnets 2A and 2B are movable in first direction X relative to first magnetic field detecting sensor 3A and second magnetic field detecting sensor 3B.

First magnet 2A and second magnet 2B are made of a magnetic material such as neodymium. First magnet 2A and second magnet 2B are substantially rectangular parallelepipeds, and the ratios of dimensions in the X direction, Y direction and Z direction are not limited. First magnet 2A has first surface 5A that is a pole surface that faces first and second magnetic field detecting sensors 3A and 3B in second direction Z. Second magnet 2B has second surface 5B that is a pole surface that faces first and second magnetic field detecting sensors 3A and 3B in second direction Z. First surface 5A and second surface 5B have different polarities. In the present embodiment, first surface 5A of first magnet 2A is the N pole, and second surface 5B of second magnet 2B is the S pole, but first surface 5A of first magnet 2A may be the S pole and second surface 5B of second magnet 2B may be the N pole.

In the following descriptions, the axis that passes through middle point MP of minimum section S and that is parallel to second direction Z as seen in third direction Y is referred to as reference axis RA, wherein minimum section S is a section that includes first and second magnets 2A and 2B in first direction X. Minimum section S that includes first and second magnets 2A and 2B is defined as a section one end of which is point 6A of first magnet 2A that is the remotest from second magnet 2B in first direction X and the other end of which is point 6B of second magnet 2B that is the remotest from first magnet 2A in first direction X.

First and second magnetic field detecting sensors 3A and 3B are arranged apart from first and second magnets 2A and 2B in second direction Z and detect the magnetic field that is generated by first and second magnets 2A and 2B. First and second magnetic field detecting sensors 3A and 3B are supported by common support structure 7. First and second magnets 2A and 2B are shared by first and second magnetic field detecting sensors 3A and 3B. First magnetic field detecting sensor 3A detects the relative displacement of first and second magnets 2A and 2B in first direction X (hereinafter, this may be referred to simply as the relative displacement of the magnets) depending on the amount of depression of brake pedal 12. First magnetic field detecting sensor 3A detects the relative displacement of the magnets in the range between the state in which brake pedal 12 is not depressed (the amount of depression is zero) and the state in which brake pedal 12 is fully depressed. Normally, first magnetic field detecting sensor 3A detects the relative displacement of first and second magnets 2A and 2B in a range of several tens of millimeters.

First magnetic field detecting sensor 3A has a sensing element that detects magnetic field intensity Bx in first direction X and a sensing element that detects magnetic field intensity Bz in second direction Z. The types of the sensing elements are not limited, and a Hall element and a magnetoresistive element, such as an AMR element and a TMR element, may be used. The processing unit of stroke sensor 1 (not illustrated) calculates the angle of the synthesized magnetic field (a vector sum of Bx and Bz) based on the magnetic field intensity that is detected by these sensing elements. Since the magnetic field distribution in the vicinity of first and second magnets 2A and 2B is obtained in advance, the relative displacement of the magnets, that is, the amount of depression of brake pedal 12, can be detected from the angle of the synthesized magnetic field.

Second magnetic field detecting sensor 3B detects magnetic field intensity Bz, which is intensity of the magnetic field in second direction Z that is generated by first and second magnets 2A and 2B. The initial position of second magnetic field detecting sensor 3B in first direction X relative to first and second magnets 2A and 2B is positioned between reference axis RA and second magnet 2B. Magnetic field intensity Bz in second direction Z that is detected by second magnetic field detecting sensor 3B changes depending on the relative displacement of the magnets, that is, the amount of depression of brake pedal 12. Second magnetic field detecting sensor 3B is used, for example, to detect that the brake pedal 12 is depressed when the vehicle is started or to control the timing when the brake lamp switches on. For this reason, it is sufficient for second magnetic field detecting sensor 3B to detect the relative displacement of the magnets in the range of the order of several millimeters at maximum, and this range corresponds to the operational range of second magnetic field detecting sensor 3B. When magnetic field intensity Bz in second direction Z that is detected by second magnetic field detecting sensor 3B reaches a predetermined value, second magnetic field detecting sensor 3B sends a signal to the control unit (not illustrated) of the vehicle, this signal indicating that Bz has reached the predetermined value. Second magnetic field detecting sensor 3B is only provided with a sensing element that detects magnetic field intensity Bz in second direction Z, and a Hall element and a magnetoresistive element, such as an AMR element and a TMR element, may be used as the sensing element.

Figure 3A:
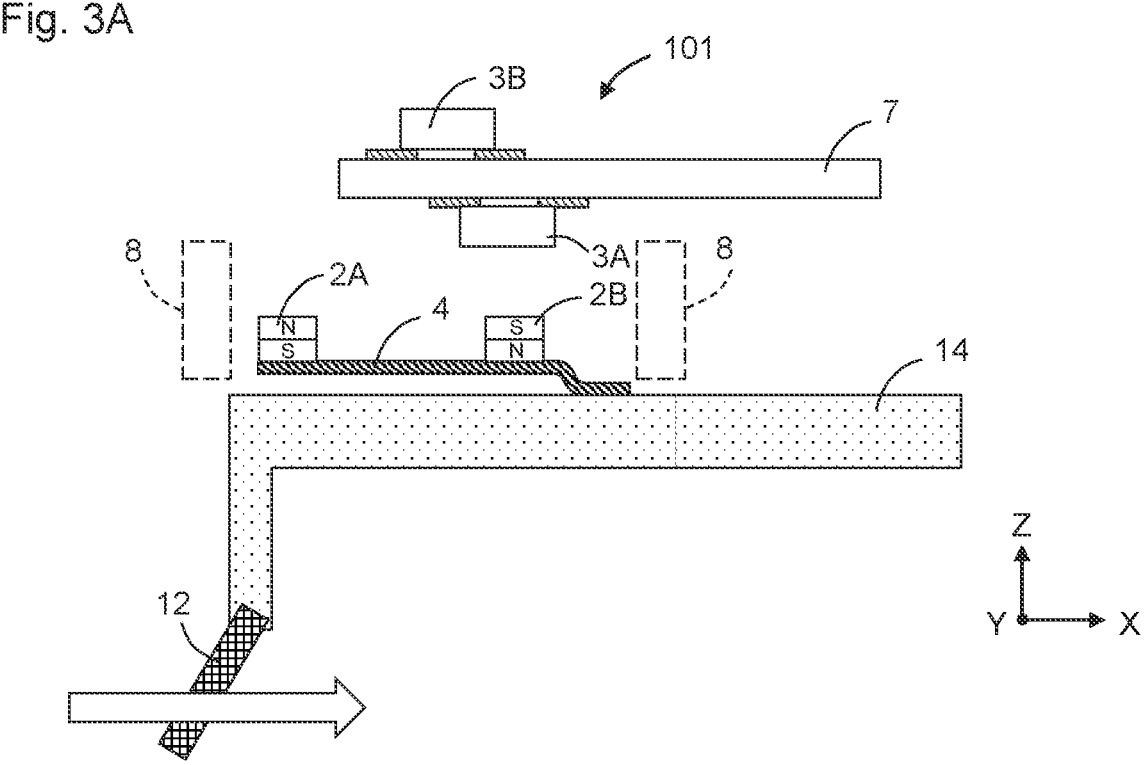
FIG. 3A is a view schematically illustrating the arrangement of a stroke sensor of Comparative Example 1.
Figure 3B:
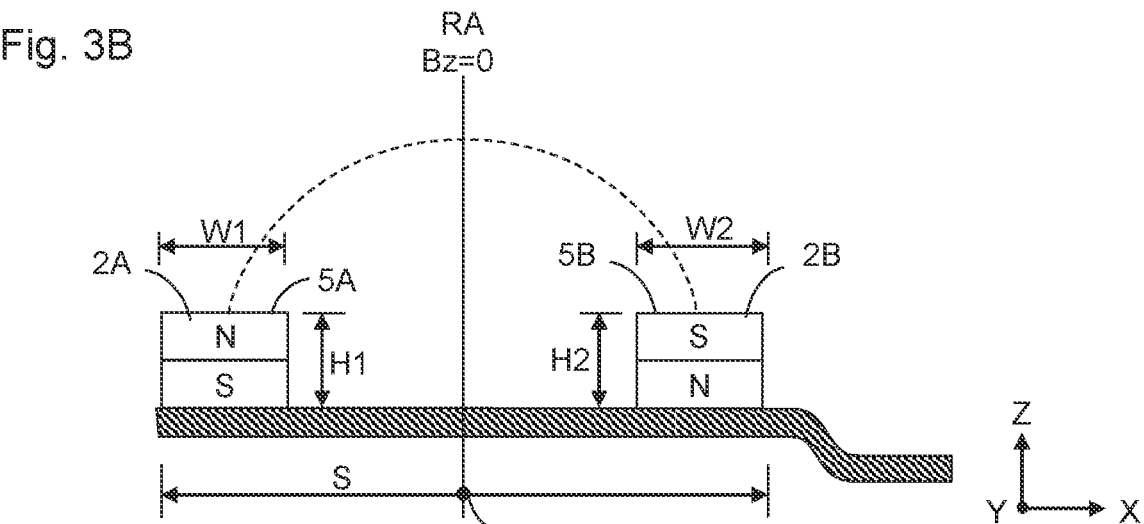
FIG. 3B is a conceptual view showing a magnetic field line that is generated by the stroke sensor according to Comparative Example 1.

FIG. 3A schematically illustrates the arrangement of stroke sensor 101 of Comparative Example 1. FIG. 3B schematically illustrates a part of the magnetic field lines of stroke sensor 101 of Comparative Example 1 as a broken line. First magnet 2A and second magnet 2B have the same shape and dimensions. Therefore, dimension W1 of first magnet 2A in first direction X is the same as dimension W2 of second magnet 2B in first direction X. In Comparative Example 1, W1=W2=5.5 mm. Height H1 of first magnet 2A (the dimension in second direction Z) and height H2 of second magnet 2B (the dimension in second direction Z) are 5 mm, and the depths of first magnet 2A and second magnet 2B (the dimensions in third direction Y) are 7 mm. Since first magnet 2A and second magnet 2B are symmetric about reference axis RA, as shown in FIG. 3B, the magnetic field distribution (the shape of the magnetic flux) that is formed by first magnet 2A and second magnet 2B is also symmetric about reference axis RA. As a result, the position in first direction X at which magnetic field intensity Bz in second direction Z is zero coincides with reference axis RA.

First magnetic field detecting sensor 3A requires that a magnetic field be applied having intensity that is greater than a predetermined threshold in order to ensure the reliability of measurement. In other words, first magnetic field detecting sensor 3A must secure the necessary magnetic field intensity to operate over the entire operation range thereof for a given magnetic field distribution. Measures that may be taken when the magnetic field intensity that is required cannot be obtained include increasing the sensitivity of the sensing element, modifying the position of first magnetic field detecting sensor 3A, modifying the magnetic field distribution, and the like. Increasing the sensitivity of the sensing element generally has a large impact on cost and therefore may not be realistic. Modifying the position of first magnetic field detecting sensor 3A may be difficult due to layout limitations. Modifying the magnetic field distribution may be achieved by modifying the position of at least one of first magnet 2A and second magnet 2B. However, since first magnet 2A and second magnet 2B are enclosed by housing 8, it may be difficult to modify the position of first magnet 2A or second magnet 2B while avoiding interference with housing 8.

Figure 2B:
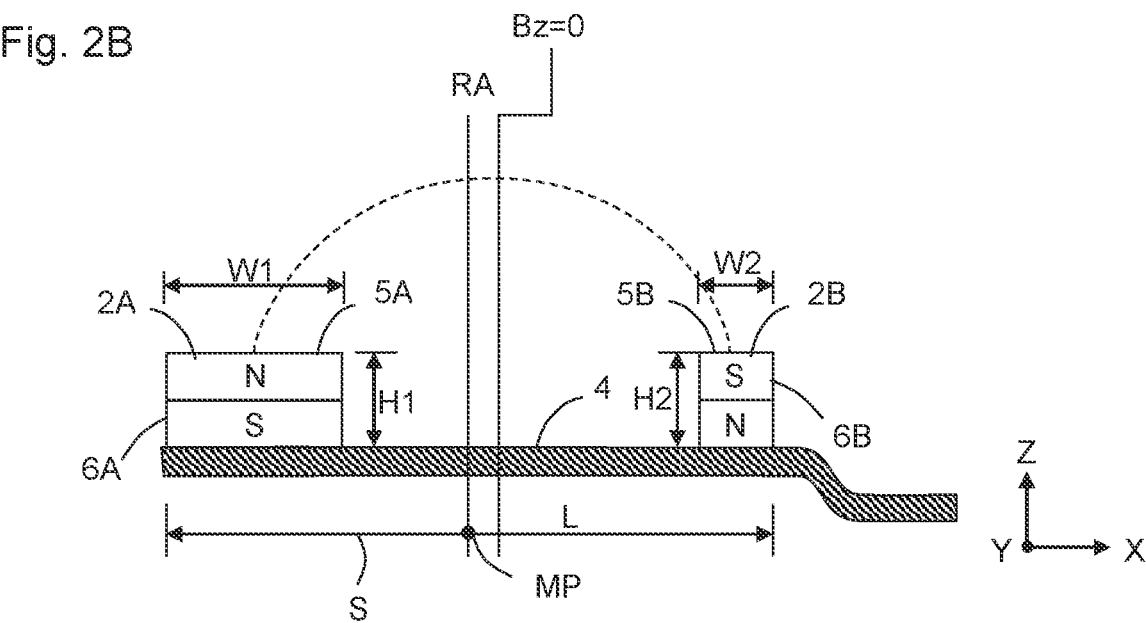
FIG. 2B is a conceptual view showing a magnetic field line that is generated by the stroke sensor according to the first embodiment.

In the present embodiment, dimension W1 of first magnet 2A in first direction X is larger than dimension W2 of second magnet 2B in first direction X. FIG. 2B conceptually illustrates a part of the magnetic field lines of stroke sensor 1 of the present embodiment as a broken line. The magnetic flux is generally shifted toward second magnet 2B, as compared to Comparative Example 1, and the position in first direction X at which magnetic field intensity Bz in second direction Z is zero is between reference axis RA and second magnet 2B. In other words, the magnetic field that is generated by first and second magnets 2A and 2B becomes asymmetric about reference axis RA. Therefore, the magnetic field distribution can be modified without changing the positions of first magnet 2A and second magnet 2B (without changing length L of minimum section S).

On the other hand, second magnetic field detecting sensor 3B is required to detect the depression of brake pedal 12 with as small an amount of the depression as possible because it is used for the purpose mentioned above. As described above, second magnetic field detecting sensor 3B is configured to send a signal when the detected magnetic field intensity Bz in second direction Z surpasses a predetermined threshold. Therefore, the relative displacement of the magnets at the time the magnetic field intensity Bz reaches the predetermined threshold must be made as small as possible.

Figure 3C:
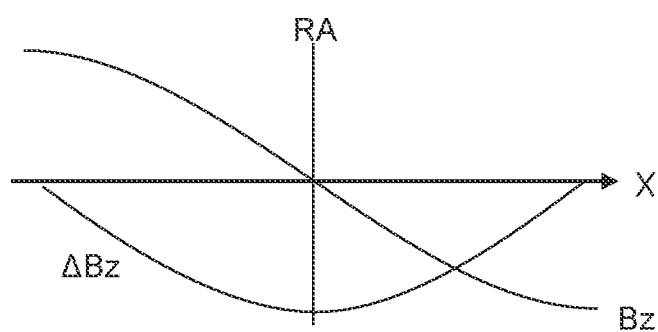
FIG. 3C is a view schematically illustrating the magnetic field intensity in the second direction in Comparative Example 1.
Figure 4:
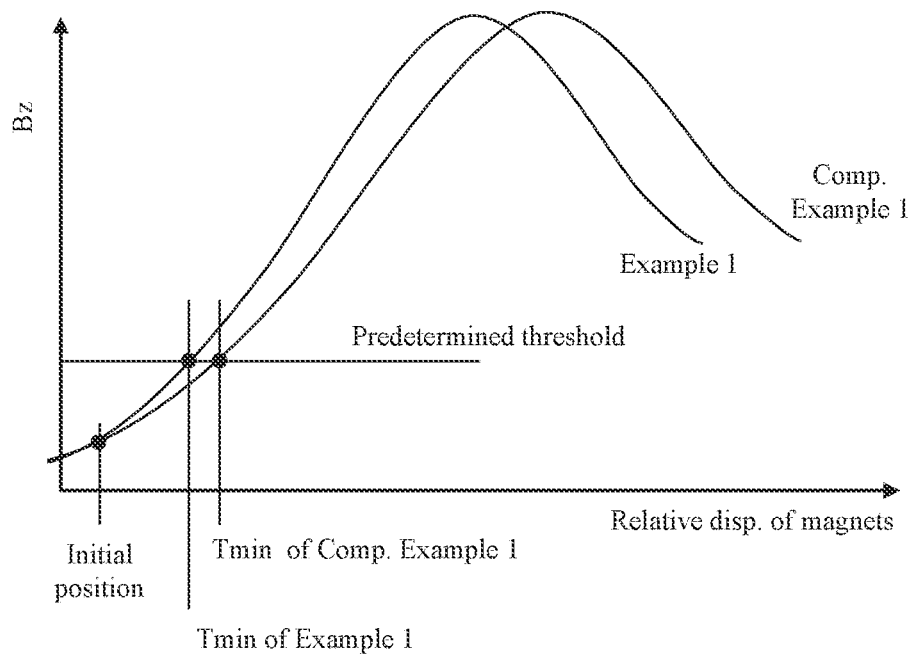
FIG. 4 is a view schematically illustrating the relationship between the relative displacement of the magnets and the magnetic field intensity in the second direction.

FIG. 4 schematically illustrates the relationship between the relative displacement of the magnets and magnetic field intensity Bz in second direction Z. Brake pedal 12 is not depressed at the initial position. In order to cause quick operation of second magnetic field detecting sensor 3B, for which magnetic field intensity Bz in second direction Z increases as brake pedal 12 is more greatly depressed (as the relative displacement of the magnets increases), it is important to make the moving distance of first and second magnets 2A and 2B that causes magnetic field intensity Bz in second direction Z to reach the predetermined threshold (hereinafter, referred to as minimum moving distance Tmin of the magnets) as small as possible. To do so, it is important to increase the change in magnetic field intensity Bz in second direction Z relative to the relative displacement of the magnets in the operation range of second magnetic field detecting sensor 3B. That is, it is effective to position second magnetic field detecting sensor 3B close to reference axis RA. This is because, as shown in FIG. 3C, magnetic field intensity Bz in second direction Z becomes zero at reference axis RA in Comparative Example 1, and the ratio of change ΔBz of magnetic field intensity Bz in second direction Z therefore becomes larger as the position in first direction X approaches reference axis RA. Table 1 summarizes minimum moving distance Tmin of the magnets of each example and comparative example, to be described later.

Figure 5A:
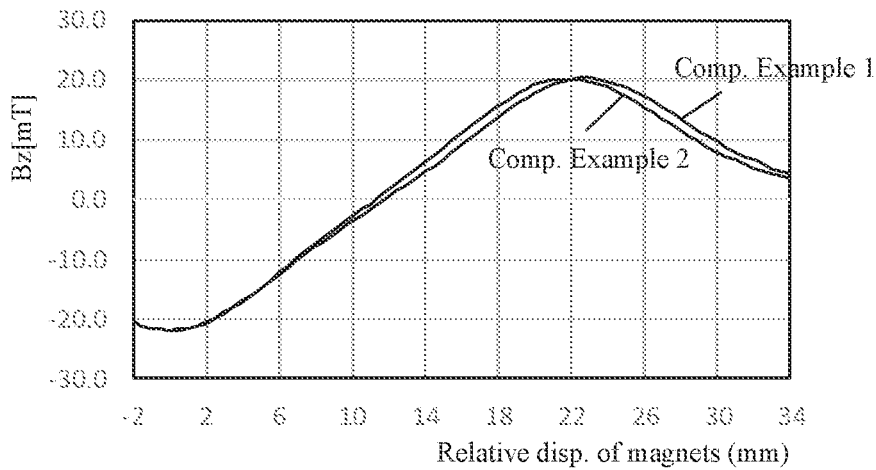
FIG. 5A is a view illustrating the relationship between the relative displacement of the magnets and the magnetic field intensity in the second direction in Comparative Examples 1 and 2.
Figure 5B:
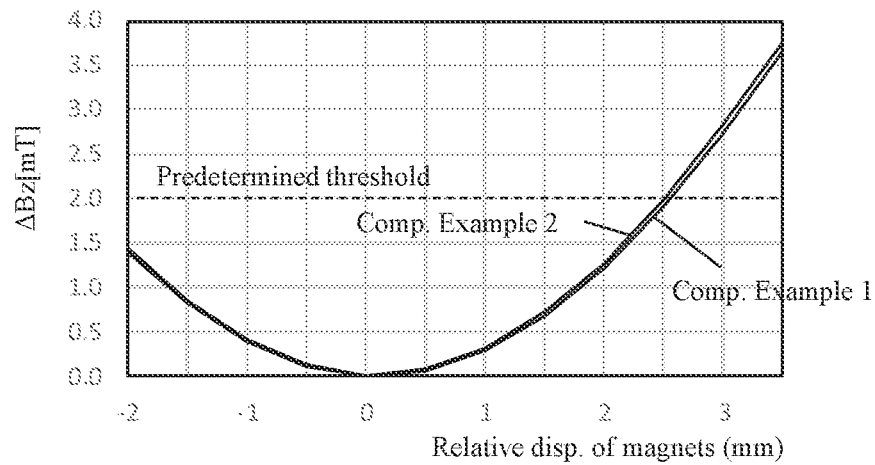
FIG. 5B is an enlarged view illustrating the relationship between the relative displacement of the magnets from the initial position and increment of the magnetic field intensity from the initial position in FIG. 5A.
Figure 5C:
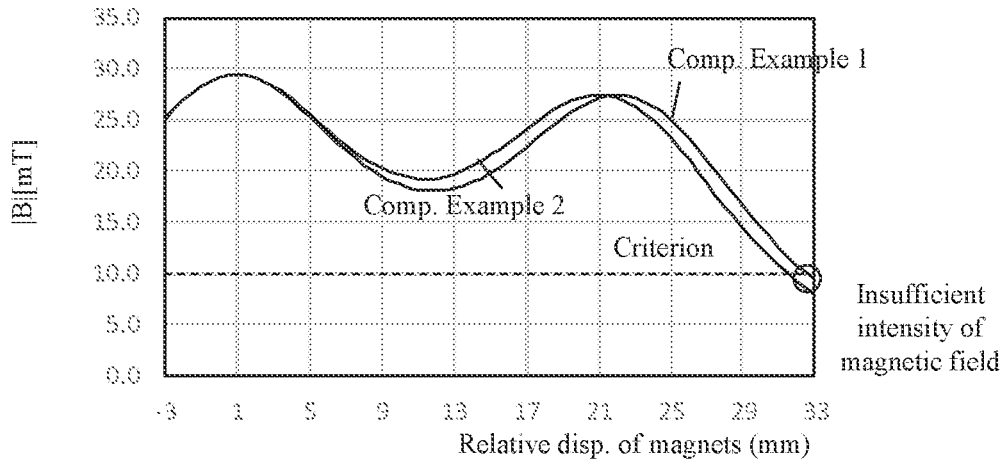
FIG. 5C is a view illustrating the magnetic field intensity that is detected by the first magnetic field detecting sensor.

In order to position second magnetic field detecting sensor 3B close to reference axis RA in Comparative Example 1 in FIG. 3A, it is possible to move second magnetic field detecting sensor 3B toward reference axis RA (a first method), to move second magnet 2B rightward (a second method), or to move first magnet 2A rightward (a third method). However, the first method and the second method may be difficult because of the layout. FIG. 5A illustrates the relationship between the relative displacement of the magnets and magnetic field intensity Bz in second direction Z when the third method is adopted in Comparative Example 1 and only first magnet 2A is moved 1 mm rightward (Comparative Example 2). FIG. 5B illustrates the relationship between the relative displacement of the magnets from the initial position (=0) and increment ΔBz of magnetic field intensity Bz from the initial position in the vicinity of the operation range of second magnetic field detecting sensor 3B in FIG. 5A. In Comparative Example 2, the magnetic field distribution is modified, and second magnetic field detecting sensor 3B can be positioned closer to reference axis RA. The two lines for the most part overlap with each other in FIG. 5B, but minimum moving distance Tmin of the magnets of Comparative Example 2 is slightly smaller than that of Comparative Example 1. On the other hand, FIG. 5C illustrates the magnetic field intensity (a vector sum of the magnetic field intensity in first direction X and the magnetic field intensity in second direction Z) that is detected by first magnetic field detecting sensor 3A in the operation range of first magnetic field detecting sensor 3A. There is a region in which the criterion for the required magnetic field intensity cannot be satisfied near the right end of the operation range. Accordingly, when only first magnet 2A is moved rightward, minimum moving distance Tmin of the magnets may be limited, but the operation of first magnetic field detecting sensor 3A may not be guaranteed.

Figure 6A:
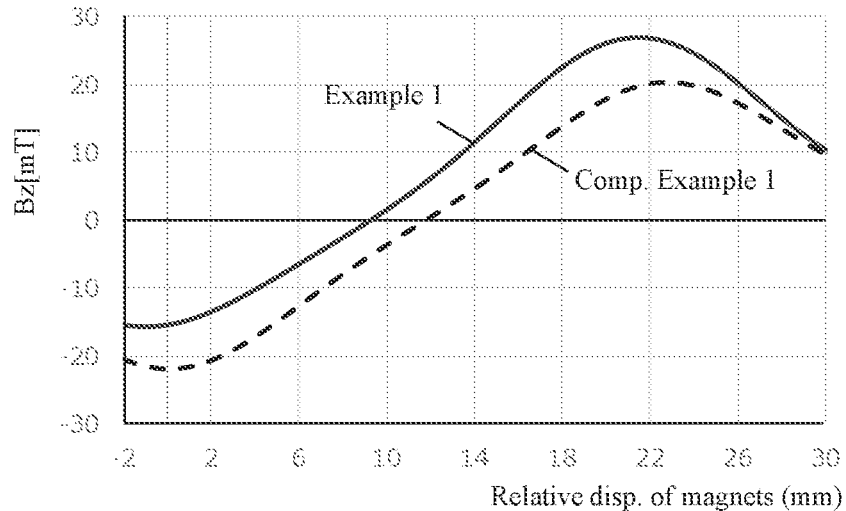
FIG. 6A is a view illustrating the relationship between the relative displacement of the magnets and the magnetic field intensity in the second direction in Example 1.
Figure 6B:
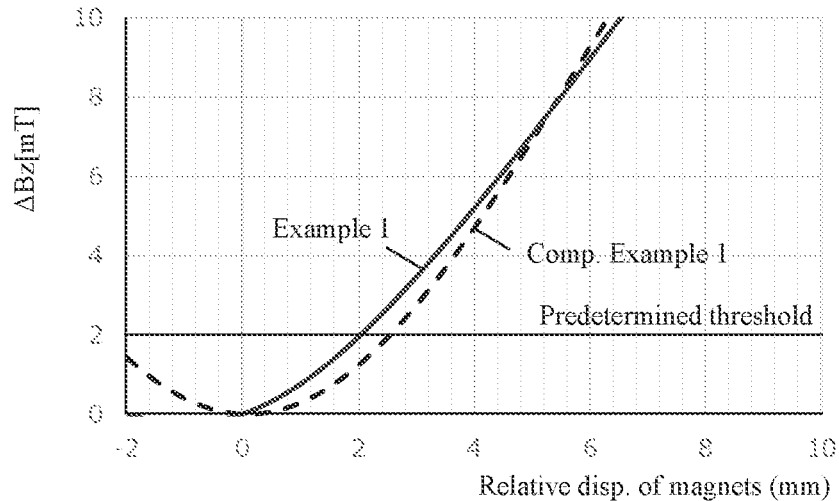
FIG. 6B is an enlarged view illustrating the relationship between the relative displacement of the magnets from the initial position and increment of the magnetic field intensity from the initial position in FIG. 6A.
Figure 6C:
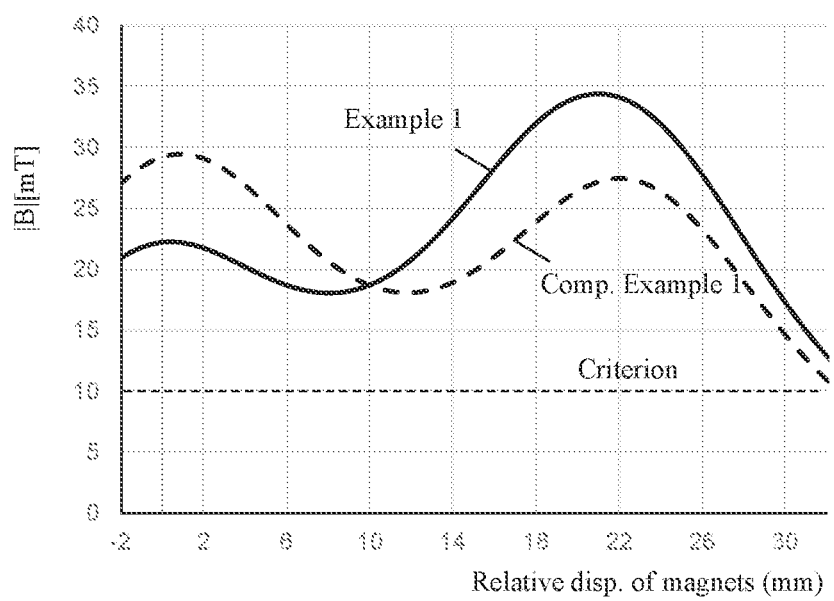
FIG. 6C is a view illustrating the magnetic field intensity that is detected by the first magnetic field detecting sensor.

FIG. 6A illustrates the relationship between the relative displacement of the magnets and magnetic field intensity Bz in second direction Z in the first embodiment, wherein W1=8 mm and W2=3.5 mm (Example 1). FIG. 6B illustrates the relationship between the relative displacement of the magnets from the initial position (=0) and increment ΔBz of magnetic field intensity Bz from the initial position in the vicinity of the operation range of second magnetic field detecting sensor 3B in FIG. 6A. The magnetic field distribution is modified by setting W1 and W2 such that W1>W2, and second magnetic field detecting sensor 3B can be positioned closer to reference axis RA. FIG. 6C illustrates the magnetic field intensity (a vector sum of the magnetic field intensity in first direction X and the magnetic field intensity in second direction Z) that is detected by first magnetic field detecting sensor 3A in the operation range of first magnetic field detecting sensor 3A. The required magnetic field intensity is ensured over the entire section of the moving range. Example 1 shows a large change in magnetic field intensity Bz in second direction Z and a small minimum moving distance Tmin of the magnets, as compared to Comparative Example 1. From the foregoing, by setting W1 and W2 such that W1>W2, it is possible to ensure the required magnetic field intensity of first magnetic field detecting sensor 3A while reducing minimum moving distance Tmin of the magnets.

Figure 7A:
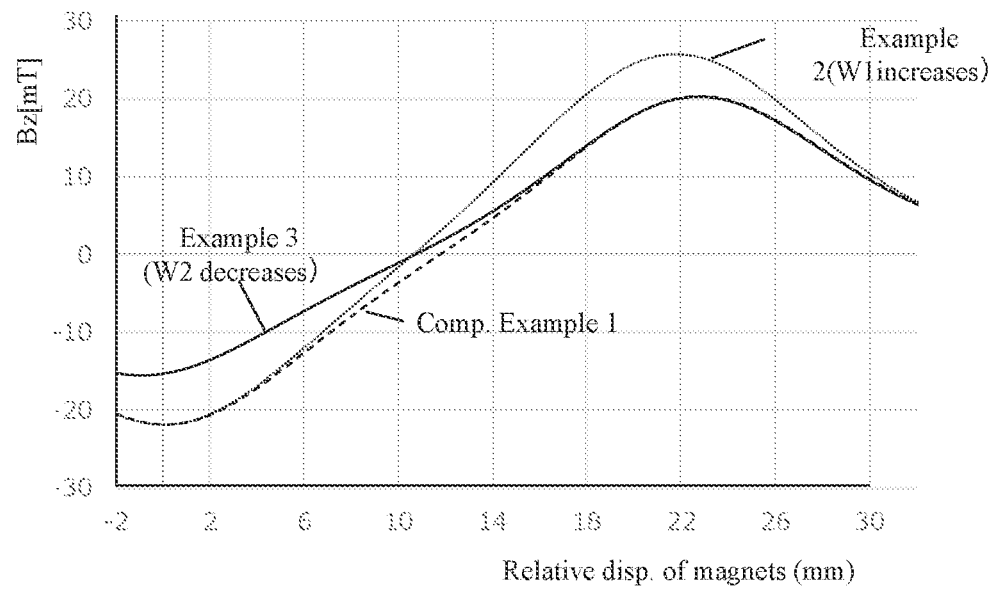
FIG. 7A is a view illustrating the relationship between the relative displacement of the magnets and the magnetic field intensity in the second direction in Examples 2 and 3.
Figure 7B:
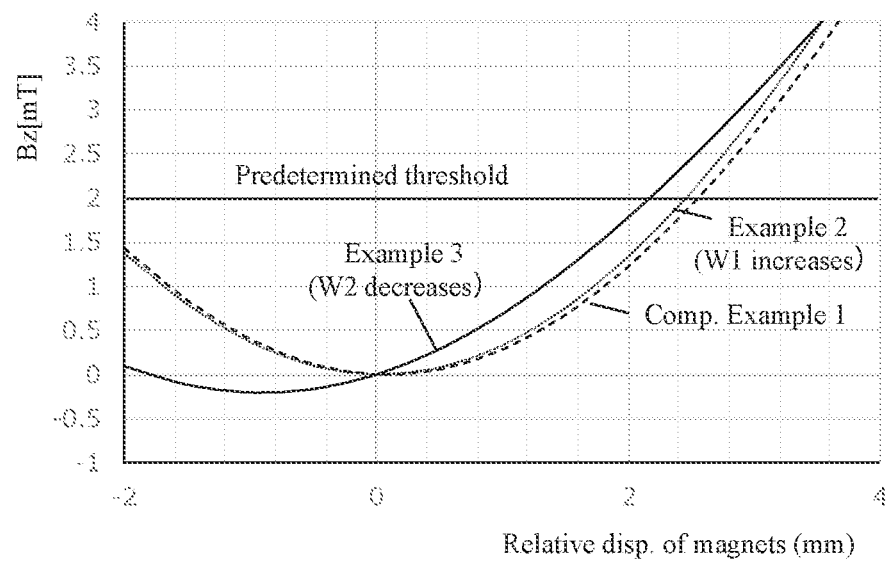
FIG. 7B an enlarged view illustrating the relationship between the relative displacement of the magnets from the initial position and increment of the magnetic field intensity from the initial position in FIG. 7A.
Figure 8A:
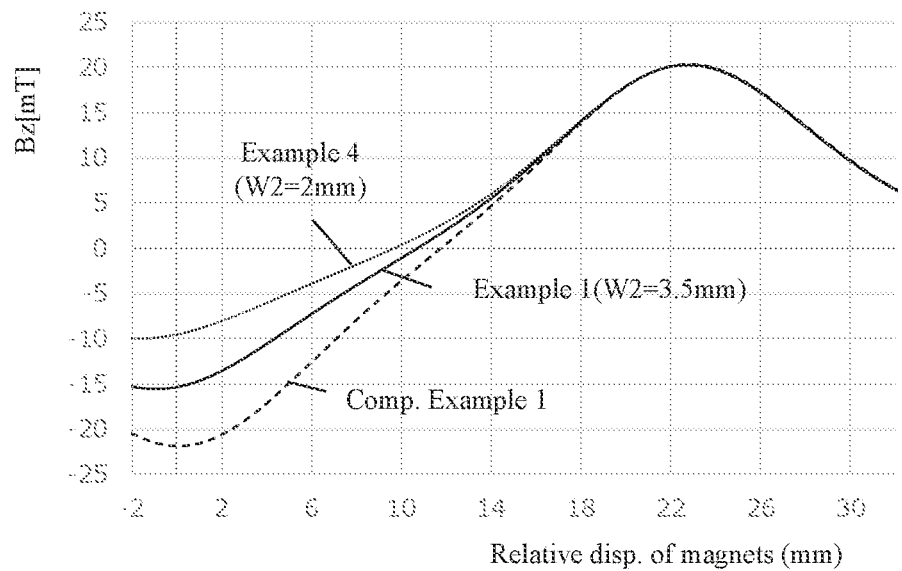
FIG. 8A is a view illustrating the relationship between the relative displacement of the magnets and the magnetic field intensity in the second direction in Example 4.
Figure 8B:
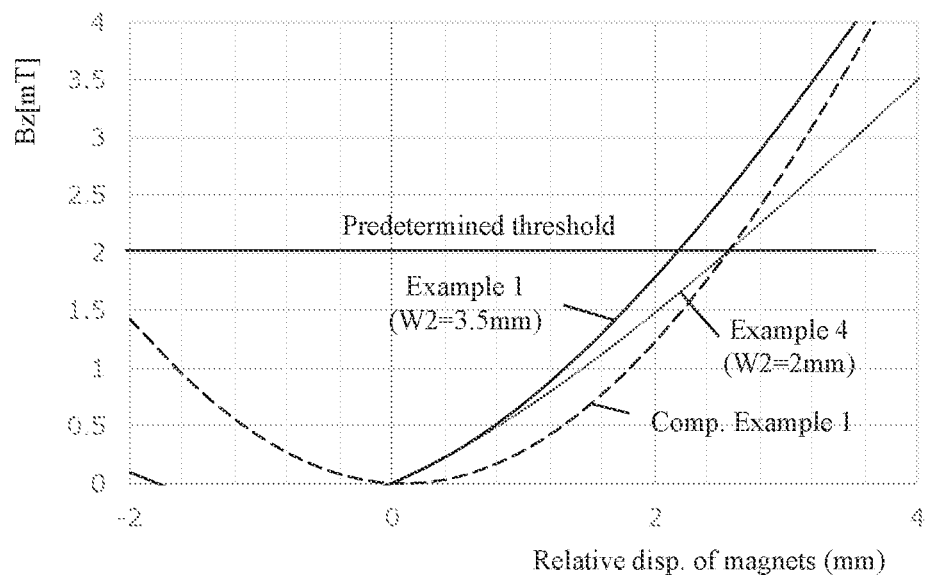
FIG. 8B is an enlarged view of FIG. 8A.

FIG. 7A illustrates the relationship between the relative displacement of the magnets and magnetic field intensity Bz in second direction Z for a case in which only W1 is increased in Comparative Example 1 (Example 2) and for a case in which only W2 is decreased in Comparative Example 1 (Example 3). FIG. 7B illustrates the relationship between the relative displacement of the magnets from the initial position (=0) and increment ΔBz of magnetic field intensity Bz from the initial position in the vicinity of the operation range of second magnetic field detecting sensor 3B in FIG. 7A. W1=7.5 mm in Example 2, and W2=3.5 mm in Example 3. As shown in Table 1, the minimum moving distance Tmin of the magnet decreases in both examples as compared to Comparative Example 1, but Example 3 in which W2 is decreased shows a larger decrease in minimum moving distance Tmin of the magnets than Example 2 in which W1 is increased. This means that there is limitation in the preferable range of (W1+W2)/L, where L is the length of minimum section S in first direction X. FIG. 8A illustrates the relationship between the relative displacement of the magnets and magnetic field intensity Bz in second direction Z for a case in which W2 is further decreased from Example 2 and W2=2 mm (Example 4). FIG. 8B is an enlarged view of FIG. 8A in the vicinity of the operation range of second magnetic field detecting sensor 3B, illustrating the relationship between the relative displacement of the magnets from the initial position and increment ΔBz of magnetic field intensity Bz. Example 4 is more effective than Comparative Example 1, but it is not preferable to set W2 to be less than 2 mm because W2 that is too small weakens the magnetic field itself.

Figure 9A:
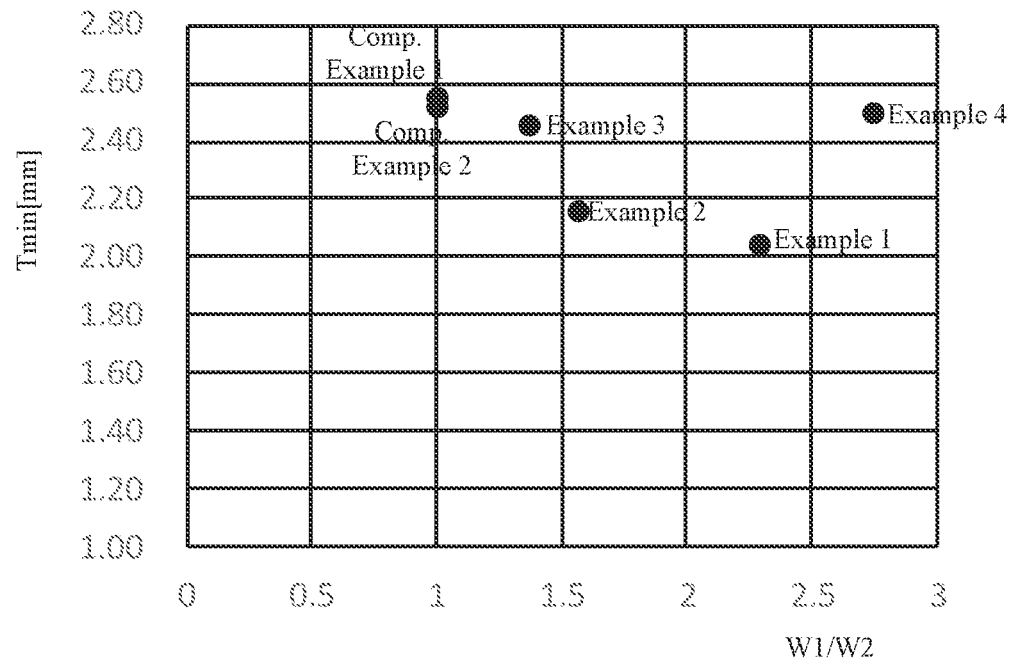
FIG. 9A is a view illustrating the relationship between W1/W2 and the minimum moving distance of the magnet.
Figure 9B:
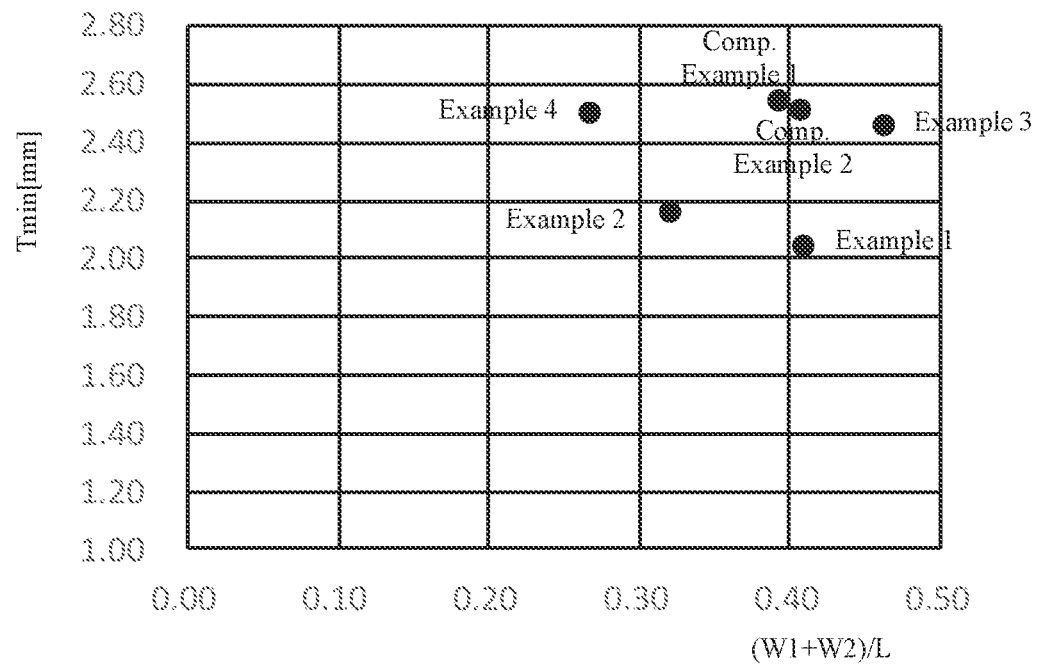
FIG. 9B is a view illustrating the relationship between (W1+W2)/L and the minimum moving distance of the magnet.

FIG. 9A illustrates the relationship between W1/W2 and minimum moving distance Tmin of the magnets for each case mentioned above, and FIG. 9B illustrates the relationship between (W1+W2)/L and minimum moving distance Tmin of the magnets for each case mentioned above. W1/W2 is preferably 1.4 or larger and 2.7 or smaller, and more preferably 1.6 or larger and 2.3 or smaller. (W1+W2)/L is preferably 0.27 or larger and 0.46 or smaller, and more preferably, 0.32 or larger and 0.42 or smaller.

TABLE 1

|  | W1 | D | W2 | L = W1 + W2 + D | W1/W2 | (W1 + W2)/L | Min. moving distance of the magnets Tmin(mm) |
|---|---|---|---|---|---|---|---|
| Comp. Example 1 | 5.5 | 17 | 5.5 | 28 | 1 | 0.39 | 2.55 |
| Comp. Example 2 | 5.5 | 16 | 5.5 | 27 | 1 | 0.41 | 2.51 |
| Example 1 | 8 | 16.5 | 3.5 | 28 | 2.29 | 0.41 | 2.05 |
| Example 2 | 5.5 | 19 | 3.5 | 28 | 1.57 | 0.32 | 2.16 |
| Example 3 | 7.5 | 15 | 5.5 | 28 | 1.36 | 0.46 | 2.46 |
| Example 4 | 5.5 | 20.5 | 2 | 28 | 2.75 | 0.27 | 2.50 |

Second Embodiment

Figure 10A:
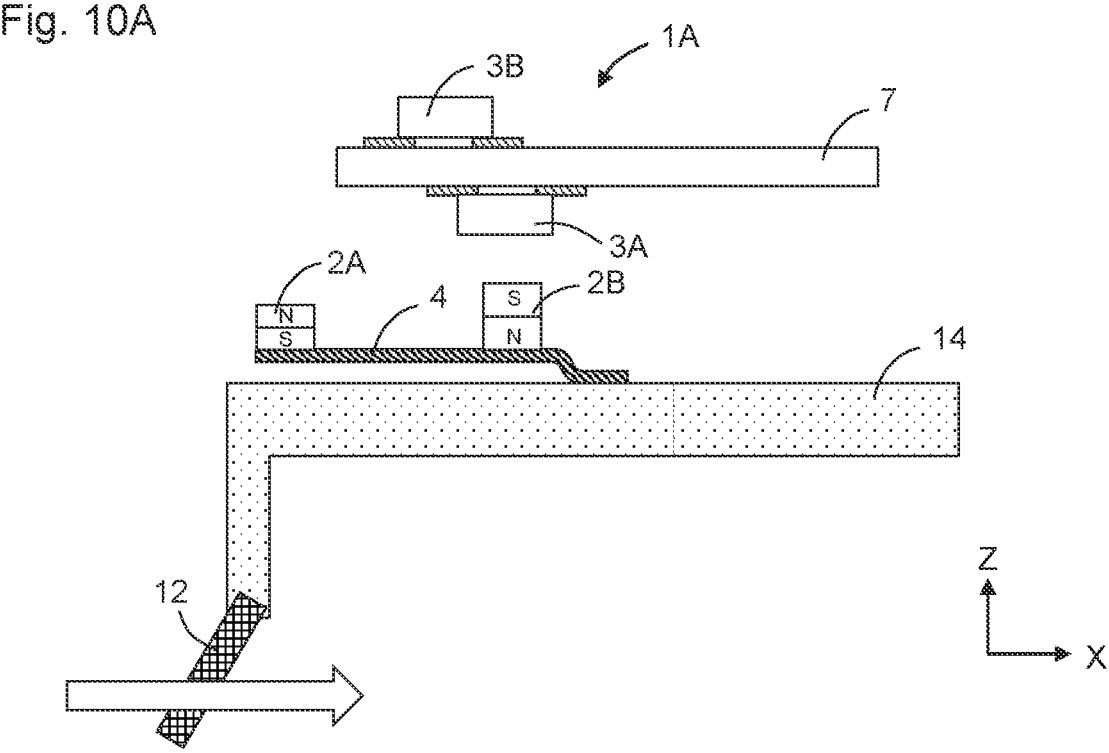
FIG. 10A is a view schematically illustrating the arrangement of a stroke sensor according to a second embodiment.
Figure 10B:
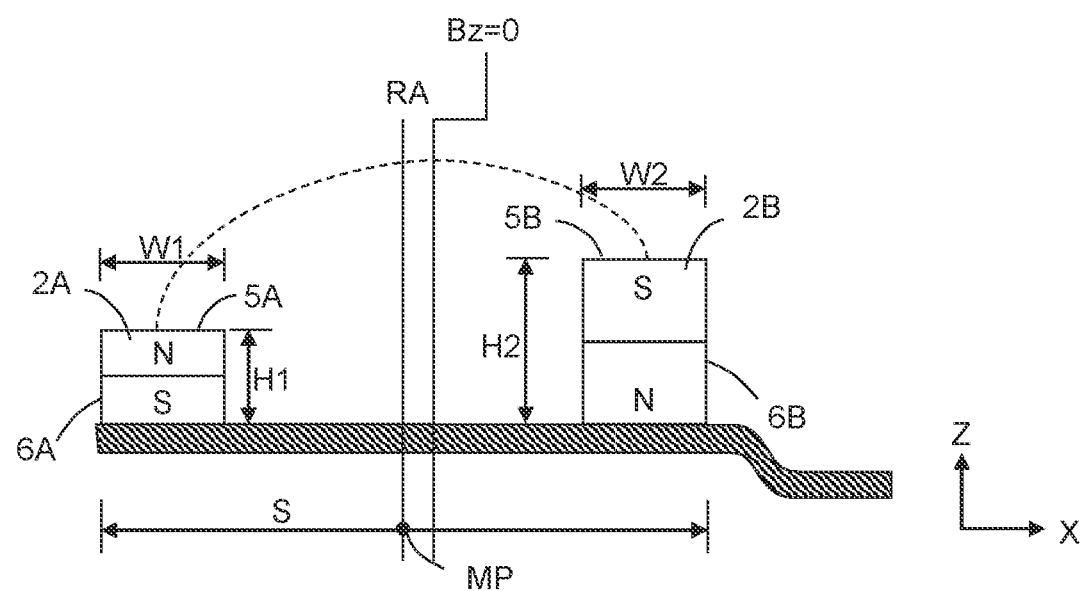
FIG. 10B is a conceptual view showing a magnetic field line that is generated by the stroke sensor according to the second embodiment.

FIG. 10A schematically illustrates the arrangement of stroke sensor 1A according to the second embodiment. FIG. 10B schematically illustrates a part of the magnetic field lines of stroke sensor stroke sensor 1A of the present embodiment as a broken line. Second surface 5B of second magnet 2B farther protrudes in second direction Z toward first and second magnetic field detecting sensors 3A and 3B as compared to first surface 5A of first magnet 2A. Unlike the first embodiment, the magnetic flux is not generally shifted toward second magnet 2B. However, due to the positional relationship in second direction Z between first surface 5A of first magnet 2A and second surface 5B of second magnet 2B, the magnetic field that is generated by first and second magnets 3A and 3B is asymmetric about reference axis RA, and the position in first direction X at which magnetic field intensity Bz in second direction Z is zero is shifted to between reference axis RA and second magnet 2B. In other words, the same effect as achieved by moving second magnet 2B rightward in FIG. 3A is achieved without moving second magnet 2B rightward. Therefore, the present embodiment has the same effect as the first embodiment.

Figure 11A:
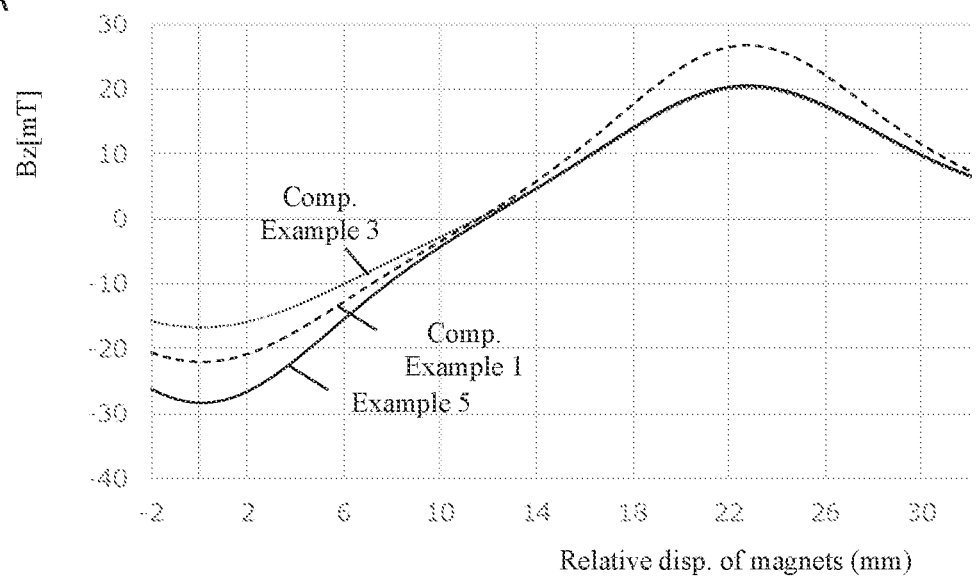
FIG. 11A is a view schematically illustrating the relationship between the relative displacement of the magnets and magnetic field intensity in the second direction in Examples 5 to 8 and Comparative Examples 1, 3, and 4.
Figure 11B:
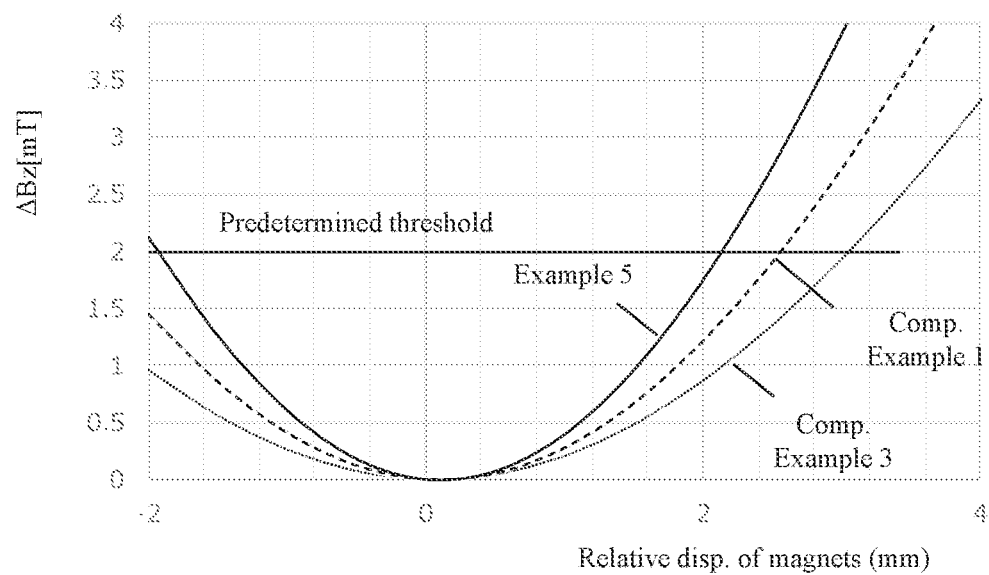
FIG. 11B an enlarged view illustrating the relationship between the relative displacement of the magnets from the initial position and increment of the magnetic field intensity from the initial position in FIG. 11A.

FIG. 11A illustrates the relationship between the relative displacement of the magnets and magnetic field intensity Bz in second direction Z for various combinations of height H1 of first magnet 2A and height H2 of second magnet 2B (Example 5, Comparative Examples 1 and 3). FIG. 11B illustrates the relationship between the relative displacement of the magnets from the initial position (=0) and increment ΔBz of magnetic field intensity Bz from the initial position in the vicinity of the operation range of second magnetic field detecting sensor 3B in FIG. 11A. Table 2 shows H1, H2, and minimum moving distance Tmin of the magnets for Example 5 and Comparative Examples 1 and 3. Since first magnet 2A and second magnet 2B are arranged on a horizontal plane, H1 and H2 show the positional relationship in second direction Z between first surface 5A of first magnet 2A and second surface 5B of second magnet 2B. The same effect as the first embodiment can be achieved by setting H1 and H2 such that H1<H2.

TABLE 2

|  | H1 | H2 | Min. moving distance Tmin of the magnets (mm) |
|---|---|---|---|
| Comp. Example 1 | 5 | 5 | 2.55 |
| Comp. Example 3 | 5 | 4 | 3.17 |
| Example 5 | 5 | 6 | 2.13 |

The present embodiment may be combined with the first embodiment. In this case, dimension W1 of first magnet 2A in first direction X is larger than dimension W2 of second magnet 2B in first direction X, and second surface 5B of second magnet 2B farther protrudes in second direction Z toward first magnetic field detecting sensor 3A as compared to first surface 5A of first magnet 2A.

Figure 12:
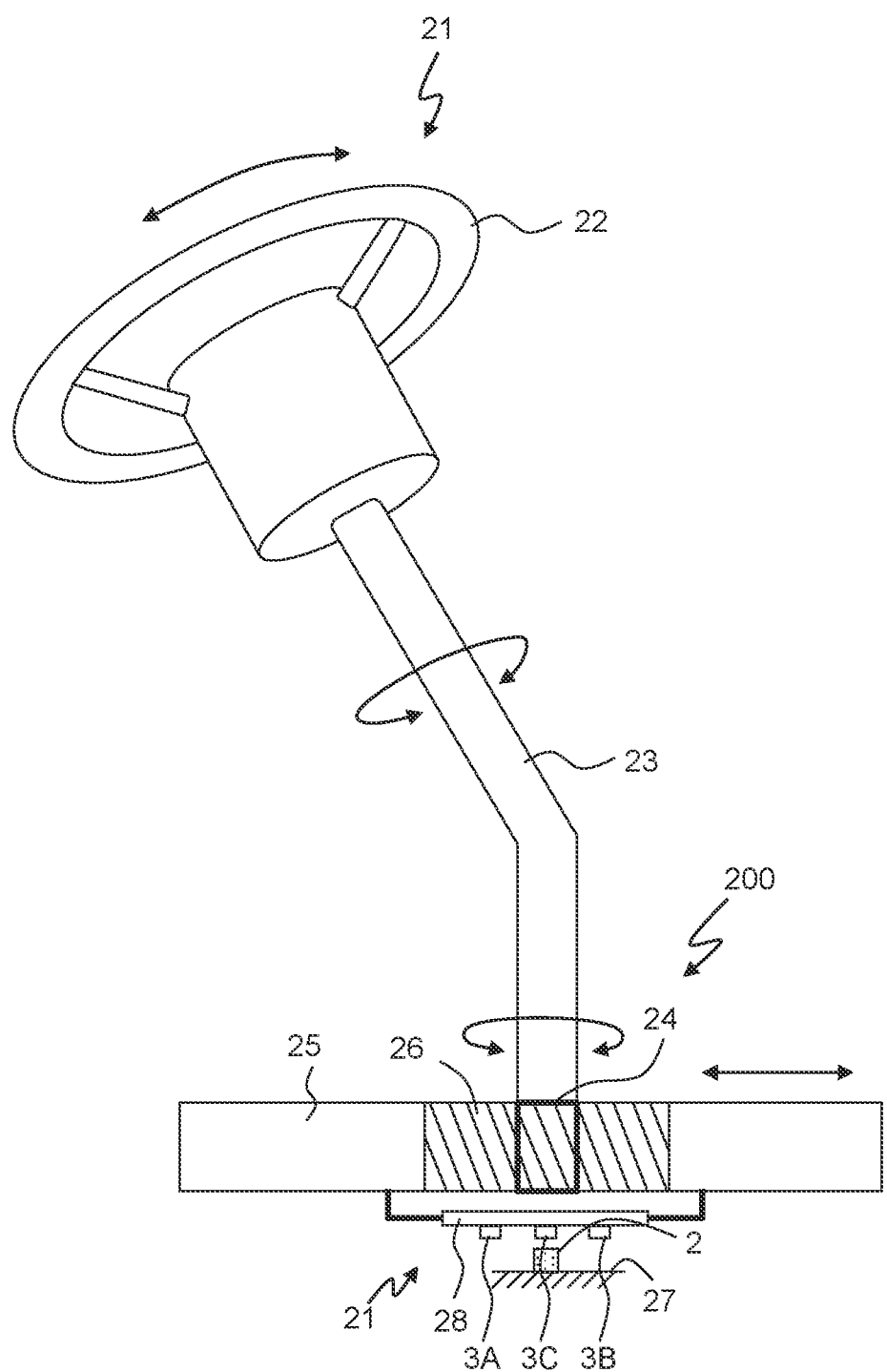
FIG. 12 is a conceptual view of a steering system for a vehicle that uses a stroke sensor.

The present invention has been described based on a number of embodiments, but the present invention is not limited to these embodiments. For example, stroke sensors 1 and 1A of the present invention may be applied to the steering system of a vehicle. FIG. 12 illustrates steering system 21 of a vehicle using stroke sensor 1. In steering system 21, one end of steering shaft 23 is connected to steering wheel 22, and pinion gear 24 is provided at the other end of steering shaft 23. Pinion gear 24 engages rack 26 of rod 25 so as to convert the rotational movement of steering shaft 23 to the linear movement of rod 25 in the vehicle lateral direction. Rod 25 is connected to front wheels (not illustrated). The orientation of the wheels can be changed by the linear movement of rod 25. First magnet 2A and second magnet 2B of stroke sensor 1 are fixed to attachment member 28 that is attached to rod 25, and first magnetic field detecting sensor 3A is fixed to vehicle body 27. Stroke sensor 1 detects the position of rod 25 in the lateral direction of the vehicle. It should be noted that second magnetic field detecting sensor 3B is omitted in stroke sensors 1 and 1A that are applied to steering system 2 of the vehicle.

Although certain preferred embodiments of the present invention have been shown and described in detail, it should be understood that various changes and modifications may be made without departing from the spirit or scope of the appended claims.

LIST OF REFERENCE NUMERALS 1, 1A, 101 stroke sensor
2A first magnet
2B second magnet
3A first magnetic field detecting sensor
3B second magnetic field detecting sensor
4 support structure
11 brake system
12 brake pedal
21 steering system
Bz magnetic field intensity in second direction Z
RA reference axis
X first direction
Z second direction

What is claimed is:

1. A stroke sensor comprising:
a first magnet;
a second magnet, wherein a distance between the first magnet and the second magnet in a first direction is fixed; and
a first magnetic field detecting sensor that is arranged apart from the first and second magnets in a second direction perpendicular to the first direction, wherein the first magnetic field detecting sensor detects a synthesized magnetic field in the first direction and the second direction that is generated by the first and second magnets, wherein
the first and second magnets are movable relative to the first magnetic field detecting sensor in the first direction,
the first magnet has a first surface that faces the first magnetic field detecting sensor in the second direction, the second magnet has a second surface that faces the first magnetic field detecting sensor in the second direction, and the first surface and the second surface have different polarities, and
a position in the first direction at which magnetic field intensity in the second direction is zero is positioned between a reference axis and the second magnet, wherein the reference axis is parallel to the second direction and passes through a middle point of a minimum section that includes the first and second magnets in the first direction,
further comprising a second magnetic field detecting sensor that detects intensity of the magnetic field in the second direction, wherein the magnetic field is formed by the first and second magnets, and
an initial position of the second magnetic field detecting sensor is positioned between the reference axis and the second magnet.

2. The stroke sensor according to claim 1, wherein dimension W1 of the first magnet in the first direction is larger than dimension W2 of the second magnet in the first direction.

3. The stroke sensor according to claim 2, wherein W1/W2 is 1.4 or larger and 2.7 or smaller.

4. The stroke sensor according to claim 3, wherein (W1+W2)/L is 0.27 or larger and 0.46 or smaller, where L is a length of the minimum section in the first direction.

5. The stroke sensor according to claim 3, wherein (W1+W2)/L is 0.32 or larger and 0.42 or smaller, where L is a length of the minimum section in the first direction.

6. The stroke sensor according to claim 2, wherein W1/W2 is 1.6 or larger and 2.3 or smaller.

7. The stroke sensor according to claim 1, wherein the second surface of the second magnet protrudes farther in the second direction toward the first magnetic field detecting sensor as compared to the first surface of the first magnet.

8. The stroke sensor according to claim 1, wherein at least one of a dimension of the first magnet in the first direction is larger than a dimension of the second magnet in the first direction, and the second surface of the second magnet protrudes farther in the second direction toward the first magnetic field detecting sensor as compared to the first surface of the first magnet.

9. The stroke sensor according to claim 1, further comprising a support structure that supports the first and second magnets and that is made of a soft magnetic body.

10. A brake system for a vehicle comprising the stroke sensor according to claim 1.

11. A steering system for a vehicle comprising the stroke sensor according to claim 1.

12. The stroke sensor according to claim 1, wherein the initial position of the second magnetic field detecting sensor is positioned near a position where magnetic field intensity in the second direction is zero.

13. The stroke sensor according to claim 1, wherein the first and second magnets move relative to the first magnetic field detecting sensor from an initial position where the second magnet faces the first magnetic field detecting sensor to a position where the first magnet faces the first magnetic field detecting sensor, and the initial position of the second magnetic field detecting sensor is positioned near the reference axis in the first direction.

14. A stroke sensor comprising:
a first magnet;
a second magnet, wherein a distance between the first magnet and the second magnet is fixed in a first direction; and
a first magnetic field detecting sensor that is arranged apart from the first and second magnets in a second direction perpendicular to the first direction, wherein the first magnetic field detecting sensor detects a synthesized magnetic field in the first direction and the second direction that is generated by the first and second magnets, wherein
the first and second magnets are movable relative to the first magnetic field detecting sensor in the first direction,
the first magnet has a first surface that faces the first magnetic field detecting sensor in the second direction, the second magnet has a second surface that faces the first magnetic field detecting sensor in the second direction, and the first surface and the second surface have different polarities, and
a magnetic field that is generated by the first and second magnets is asymmetric about a reference axis, wherein the reference axis is parallel to the second direction and passes through a middle point of a minimum section that includes the first and second magnets in the first direction,
further comprising a second magnetic field detecting sensor that detects intensity of the magnetic field in the second direction, wherein the magnetic field is formed by the first and second magnets, and
an initial position of the second magnetic field detecting sensor is positioned between the reference axis and the second magnet.

15. The stroke sensor according to claim 14, wherein dimension W1 of the first magnet in the first direction is larger than dimension W2 of the second magnet in the first direction.

16. The stroke sensor according to claim 14, wherein the second surface of the second magnet protrudes farther in the second direction toward the first magnetic field detecting sensor as compared to the first surface of the first magnet.

17. The stroke sensor according to claim 14, wherein at least one of a dimension of the first magnet in the first direction is larger than a dimension of the second magnet in the first direction, and the second surface of the second magnet protrudes farther in the second direction toward the first magnetic field detecting sensor as compared to the first surface of the first magnet.

18. The stroke sensor according to claim 14, further comprising a support structure that supports the first and second magnets and that is made of a soft magnetic body.

19. A brake system for a vehicle comprising the stroke sensor according to claim 14.

20. A steering system for a vehicle comprising the stroke sensor according to claim 14.

21. The stroke sensor according to claim 14, wherein the initial position of the second magnetic field detecting sensor is positioned near a position where magnetic field intensity in the second direction is zero.

22. The stroke sensor according to claim 14, wherein the first and second magnets move relative to the first magnetic field detecting sensor from an initial position where the second magnet faces the first magnetic field detecting sensor to a position where the first magnet faces the first magnetic field detecting sensor, and the initial position of the second magnetic field detecting sensor is positioned near the reference axis in the first direction.

* * * * *